United States Patent
Tsubono et al.

(10) Patent No.: US 7,516,767 B2
(45) Date of Patent: Apr. 14, 2009

(54) PNEUMATIC TIRE WITH TREAD HAVING ZIGZAG SIPES

(75) Inventors: Fumihiro Tsubono, Kobe (JP); Mitsuharu Koya, Kobe (JP); Naoki Kageyama, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 146 days.

(21) Appl. No.: 11/284,848

(22) Filed: Nov. 23, 2005

(65) Prior Publication Data

US 2006/0118221 A1 Jun. 8, 2006

(30) Foreign Application Priority Data

Dec. 8, 2004 (JP) .............................. 2004-355324

(51) Int. Cl.
*B60C 11/12* (2006.01)
(52) U.S. Cl. .................... 152/209.21; 152/209.23; 152/902; 425/28.1; 425/46
(58) Field of Classification Search ............ 152/209.21, 152/209.23, DIG. 3, 902; 425/28.1, 35, 46
See application file for complete search history.

(56) References Cited

U.S. PATENT DOCUMENTS

| | | | | |
|---|---|---|---|---|
| 5,350,001 | A | * | 9/1994 | Beckmann et al. ..... 152/DIG. 3 |
| 5,783,002 | A | * | 7/1998 | Lagnier ................. 152/DIG. 3 |
| 6,026,875 | A | * | 2/2000 | Diensthuber et al. ... 152/DIG. 3 |
| 6,907,910 | B2 | | 6/2005 | Iwamura |
| 2004/0134579 | A1 | * | 7/2004 | Tanaka ..................... 152/209.1 |
| 2005/0150581 | A1 | * | 7/2005 | Kishida ................. 152/209.18 |
| 2005/0211354 | A1 | * | 9/2005 | Shinmura et al. ...... 152/209.18 |
| 2006/0086445 | A1 | * | 4/2006 | Kishida ................. 152/209.18 |

FOREIGN PATENT DOCUMENTS

| | | | |
|---|---|---|---|
| EP | 696521 | * | 2/1996 |
| EP | 864448 | * | 9/1998 |

* cited by examiner

*Primary Examiner*—Steven D Maki
(74) *Attorney, Agent, or Firm*—Birch, Stewart, Kolasch & Birch, LLP

(57) ABSTRACT

A pneumatic tire comprises a tread portion provided with sipes, the sipes each having a zigzag configuration at any depth from the top of the sipe to a certain depth, and the zigzag configuration having vertexes Q1 on one side of the zigzag and vertexes Q2 on the other side of the zigzag, wherein as the depth increases from the top of the sipe to said certain depth, the vertexes Q1 shift in the longitudinal direction of the sipe and the direction of the shift is turned at least once such that the vertexes Q1 first shift towards one direction then towards the other direction, thereby describing a zigzag line extending from the top of the sipe to said certain depth and having at least one tuning point, but the vertexes Q2 describe lines which are linear or less zigzag when compared with the zigzag lines described by the vertexes Q1.

10 Claims, 9 Drawing Sheets

PNEUMATIC TIRE WITH TREAD HAVING ZIGZAG SIPES

The present invention relates to a pneumatic tire, more particularly to a structure of a sipe better suited for studless tires.

Usually, pneumatic tires are provided in the tread portion with sipes in order to improve wet grip performance or in order to decrease the rigidity of tread elements such as block and rib to optimize the tread rigidity distribution. Especially, in the case of studless tires, a large number of sipes are formed to utilize the edge effect of the sipes during running on the ice road. However, even if the number of sipes is increased, the edge effect is not necessarily increased because, due to the sipes, the rigidity of the tread element decreases and deformation of the tread element increases. As a result, the force to stick the edges to the road surface decreases and the engaging force therebetween, namely, road grip decreases.

In order to lessen the deformation such as collapse and lean of the tread element, as shown in FIG. 16, a sipe having walls made up of parallelograms was proposed in the Japanese patent application publication JP-2003-25812-A (corresponding to U.S. Pat. No. 6,907,910). In this structure, as the opposite walls are engaged with each other, the deformation of the tread element is reduced.

In order to increase the engaging force, however, if the roughness of the opposite walls is increased, sipping blades which are disposed on the inside of a tire vulcanizing mold to form the sipes become hard to pull out from the vulcanized tire.

Therefore, a primary object of the present invention is to provide a sipe structure by which a large engaging force can be obtained between the opposite walls of the sipe, but the pulling-out forcer of the sipping blade is effectively decreased.

Another object of the present invention is to provide a pneumatic tire provided with sipes having such improved structure and thereby having improved tire performance such as steering stability on the ice road as well as dry paved road.

Still another object of the present invention is to provide a sipping blade disposed on the inside of a tire vulcanizing mold to form the sipe, which can be easily pulled out from the vulcanized tread rubber to prevent the sipping blade from being damaged and thereby improving the tire manufacturing efficiency.

According to one aspect of the present invention, a pneumatic tire comprises a tread portion provided with sipes, the sipes each having a zigzag configuration at any depth from the top of the sipe to a certain depth, the zigzag configuration having vertexes Q1 on one side of the zigzag and vertexes Q2 on the other side of the zigzag, wherein as the depth increases from the top of the sipe to said certain depth, the vertexes Q1 shift in the longitudinal direction of the sipe, and the direction of the shift is turned at least once such that the vertexes Q1 first shift towards one direction then towards the other direction, thereby describing a zigzag line extending from the top of the sipe to the certain depth, but the vertexes Q2 (1) do not shift in the longitudinal direction, or (2) shift toward one direction without turning the direction of the shift, or (3) shift in the longitudinal direction of the sipe, turning the direction of the shift at least once, but the shift thereof is less than the shift of the vertexes Q1.

Accordingly, the lines which are described by the vertexes Q2 to extend from the top of the sipe to the certain depth become less zigzag or more linear when compared with the zigzag lines described by the vertexes Q1. As a result, it becomes possible to reduce the pulling-out resistance of the sipping blade without decreasing the rigidity of the tread element.

Embodiments of the present invention will now be described in detail in conjunction with the accompanying drawings.

Figure 1:
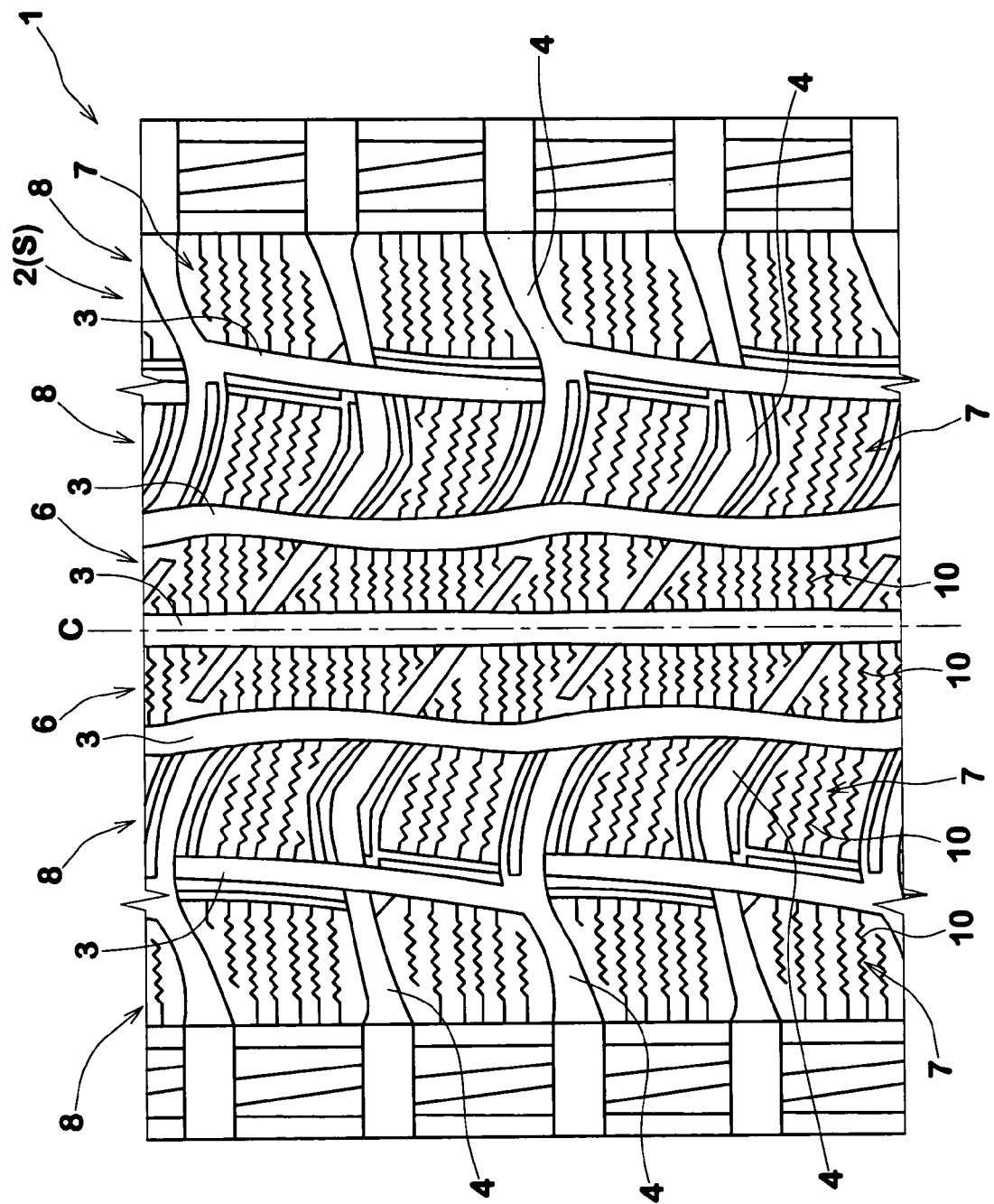
FIG. 1 is a developed partial plan view of a pneumatic tire according to the present invention.

The pneumatic tire 1 according to the present invention comprises a tread portion 2, a pair of axially spaced bead portions, a pair of sidewall portions extending between the tread edges and the bead portions as well known in the art. In the following embodiments, the tire 1 is a studless tire for passenger cars. FIG. 1 shows an example of the tread pattern for the studless tire.

The tread portion 2 is provided with tread grooves 3 and 4 to divide the tread portion 2 into tread elements 6 and 7.

The tread grooves 3 and 4 are for drainage purpose, and the width thereof is preferably at least 3.5 mm.

In FIG. 1, the tread grooves include circumferential main grooves 3 extending circumferentially of the tire and lateral main grooves 4 extending crosswise to the circumferential main grooves 3, whereby a ribs 6 is formed on each side of the tire equator C, and on the axially outside of the rib 6, two circumferential rows 8 of blocks 7 are formed. Thus, in this example, the tread pattern is so called rib-block pattern. It is however also possible to provide another tread pattern, for example, a block pattern made up of blocks only.

According to the present invention, such tread elements, namely, rib 6, block 7 and the like are provided in the top surfaces S thereof or ground contacting surfaces with sipes 10.

In this example, every tread element 6, 7 is provided with a plurality of sipes 10 substantially in parallel with each other.

A sipe is a cut or very narrow slot having a thickness or a groove width of less than about 1.5 mm, usually about less than 1 mm, and formed by a blade attached to the inside of a tire vulcanizing mold as well known in the art. Thus, the sipping blade has a shape and dimensions corresponding to the those of the resultant sipe. Therefore, such redundant description will be omitted hereinafter.

Figure 2:
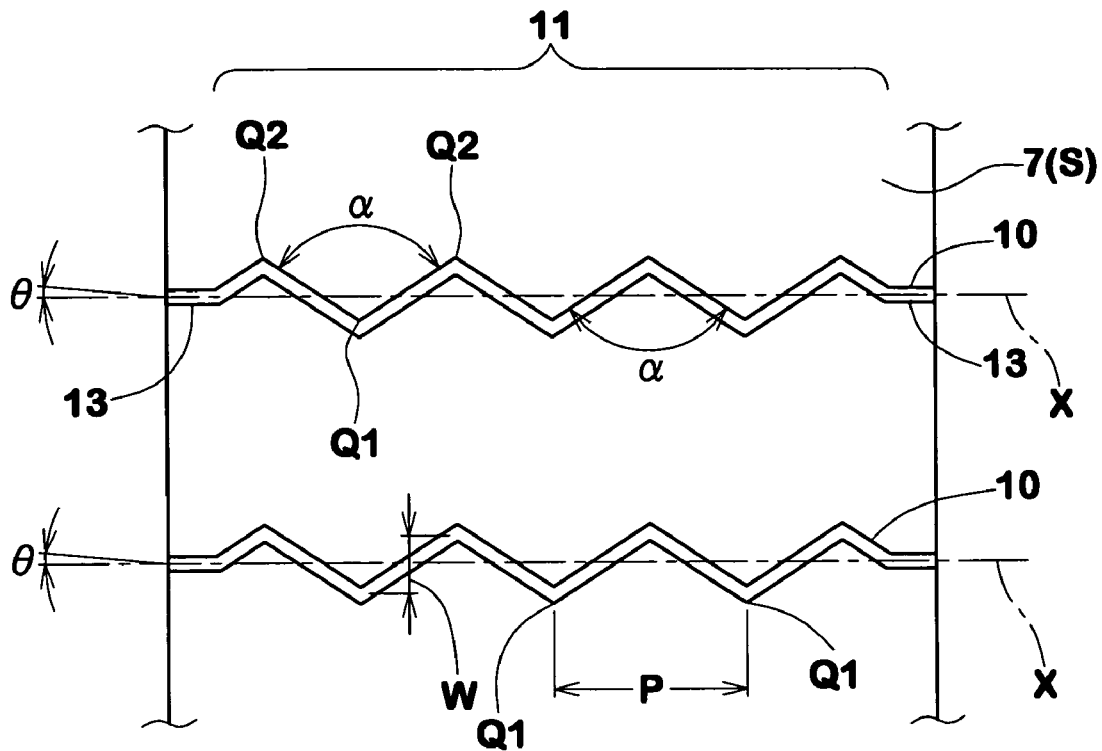
FIG. 2 is an enlarged plan view of sipes showing a zigzag configuration thereof at the open top.

The sipe 10 extends zigzag between vertexes Q1 on one side of a center line x to vertexes Q2 on the other side and vice versa, repeatedly, as shown in FIG. 2 which shows the open top 11 of the sipe. Here, the center line x means the center of the peak-to-peak amplitude of the zigzag.

In view of maximizing the driving force and braking force on the ice road, the inclination angle (theta) of the center line x is preferably set in a range of not more than 20 degrees with respect to the axial direction of the tire.

Figure 3:
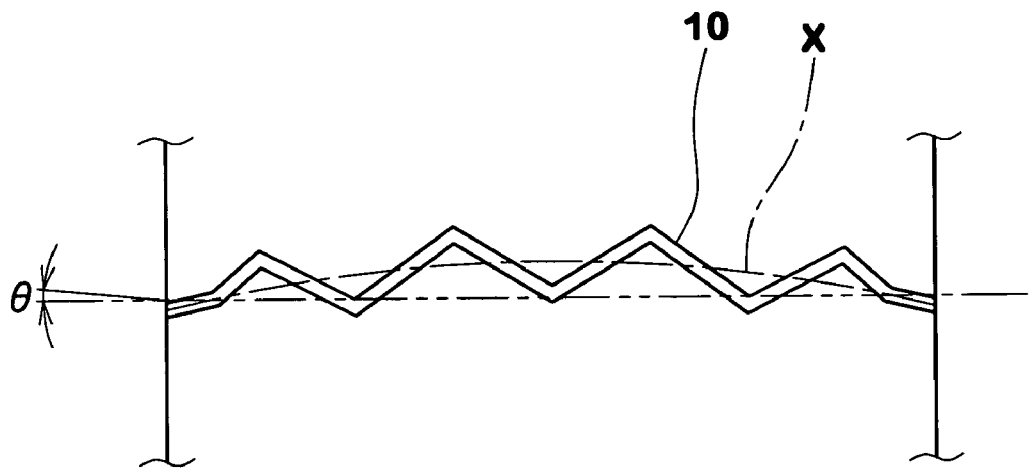
FIG. 3 shows another example of the zigzag configuration extending along a slightly curved line.

In the example shown in FIG. 2, the center line x is straight, but it may be curved as shown in FIG. 3.

The expression "the sipes 10 are substantially in parallel with each other" means that the center lines x thereof are substantially parallel with each other. If the difference in the angle of the center line x between the adjacent sipes is less than 10 degrees, the sipes can be regarded as substantially parallel.

The sipe 10 in this example has an extended portion 13 on each side of the zigzag main portion 11. Each of the extended portions 13 extends along an extension of the center line x in a straight line (FIG. 2) or in a slightly curved manner (FIG. 3).

Both ends of the sipe 10 are opened at the side walls of the tread element 6, 7, but it is also possible that both ends are closed within the tread element 6, 7, or one end is opened and the other end is closed. In this example, both ends are opened at the tread element's side walls extending in the tire circumferential direction.

As to the zigzag configuration, not only a linear zigzag line made up of straight segments only as shown in FIG. 2, but also a zigzag line made up of slightly curved segments to have a waveform like a sinusoidal waveform or the like may be used too. In view of the tread block rigidity and the bending rigidity of the sipping blade, a linear zigzag shape is suitably employed. In this case, it is preferable that the vertexes or corners are rounded by a small radius of about 1 mm for example.

In the case of a linear zigzag line, if the amplitude w of the zigzag becomes too large when compared with the pitch lengths P of the zigzag, as the zigzag angle (alpha) becomes narrow, uneven wear becomes liable to occur starting from the apexes of the acute corners. Accordingly, it is desirable that the zigzag angle (alpha) is in a range of from 90 to 150 degrees, and the amplitude w is in a range of from 1.0 to 5.0 mm. Thus, the amplitude w and pitches P are determined so that the angle (alpha) satisfies the above range. Here, one pitch length corresponds to one wavelength between the vertexes on the same side of the center line X, namely, (Q1 and Q1) or (Q2 and Q2). A half-pitch length corresponds to a half wavelength between the adjacent vertexes (Q1 and Q2) or (Q2 and Q1).

In this example, the amplitude w is constant in the depthwise direction Ff. Accordingly, at any depth from the top 10*a* to the bottom 10*b* of the sipe 10, the amplitude w is the same. Further, each of the pitch lengths are constant in the depthwise direction Ff, but the ratio of two half-pitch lengths (Q1-Q2) and (Q2-Q1) making up one pitch length (Q1-Q1) is varied in the depthwise direction Ff.

Figure 4:
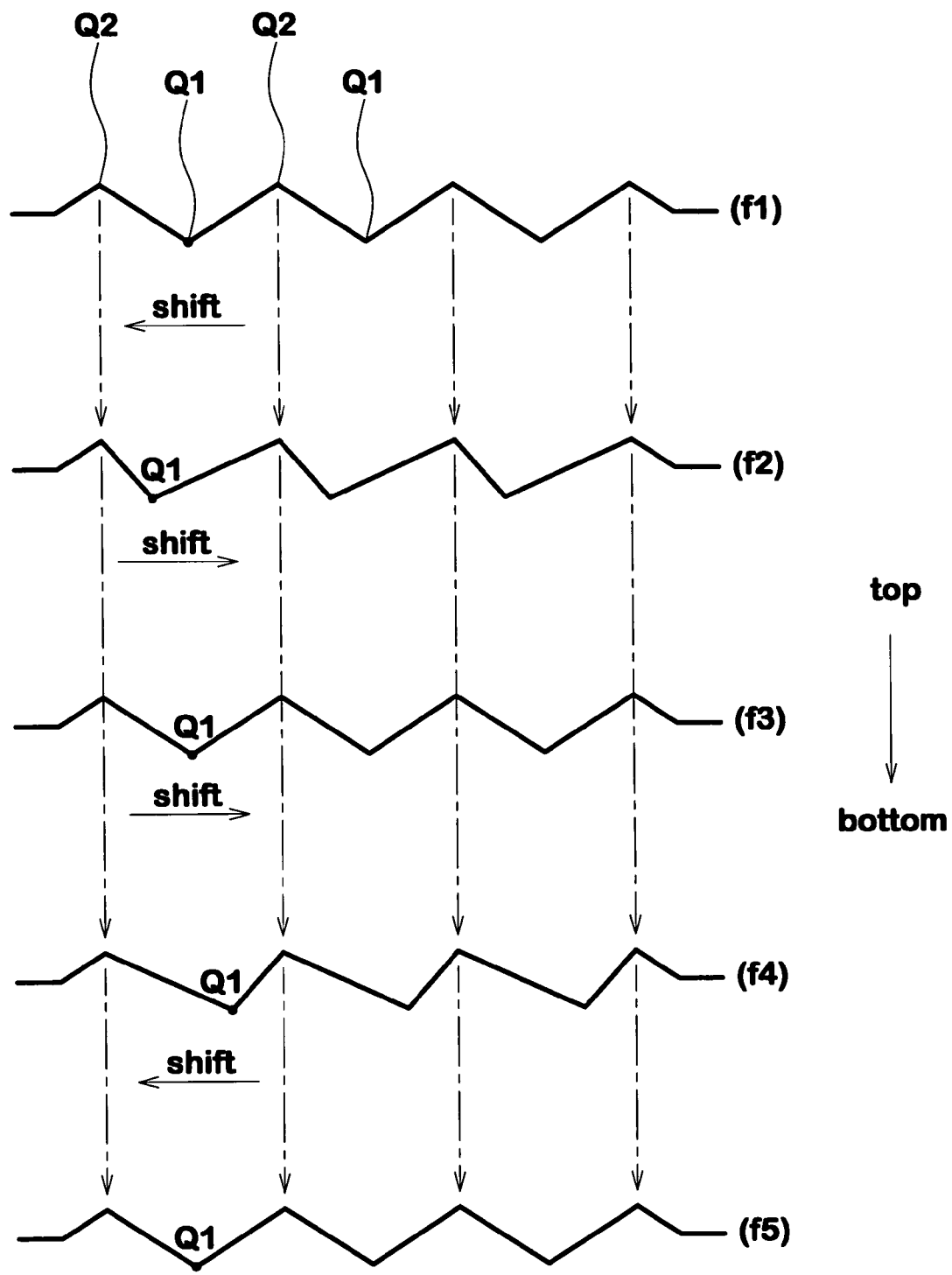
FIG. 4 is a diagram showing a change in the zigzag configuration of a sipe.

FIG. 4 shows such a variation of the ratio. For example, when one wave between Q2 and Q2 on the left-hand side of the figure is considered, the ratio of the half-pitch length (Q2-Q1) to the half-pitch length (Q1-Q2) is 1.0 at a depth level (f1) corresponding to the top 10*a* of the sipe 10. As the depth increases, the length (Q2-Q1) becomes relatively shorter than the length (Q1-Q2) and accordingly the ratio becomes less than 1.0, and at a level (f2) the ratio becomes a minimal value. Thereafter, as the depth increase, the ratio becomes increased and at a level (f3) in the middle of the depth the ratio returns to 1.0. As the depth becomes further increased from (f3), the length (Q2-Q1) becomes relatively longer than the length (Q1-Q2) and accordingly the ratio becomes more than 1.0, and at a level (f4) the ratio becomes a maximal value. Then, as the depth becomes increased from (f3), the ratio becomes decreased and at a level (f4) corresponding to the bottom, the ratio again returns to 1.0.

All the waves make such a variation.

Figure 5:
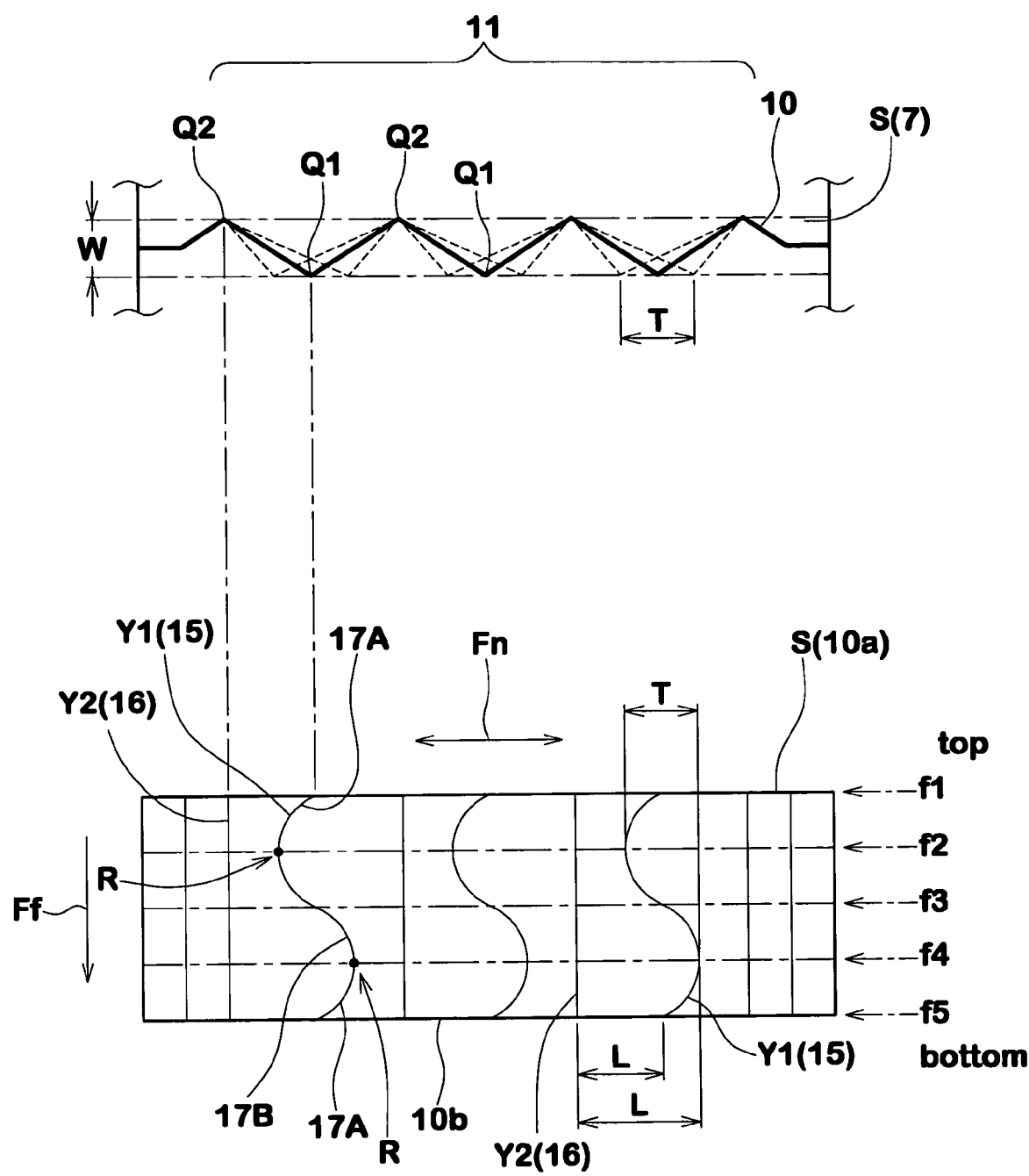
FIG. 5 is a diagram showing longitudinal shifts of the zigzag's vertexes Q1 in a top view of a sipe, and the lines described by the vertexes Q1 and Q2 in a side view of the sipe.

Thus, as shown in FIG. 5, when viewed from above the open top of the sipe and viewed in the normal direction to the longitudinal direction Fn of the sipe, as the depth increases, the vertexes Q1 on one side of the center line shift in the longitudinal direction of the sipe towards one direction then the opposite direction at lest one cycle. But, the vertexes Q2 on the other side do not make such cyclic shift involving a change of the shift direction.

Figure 6:
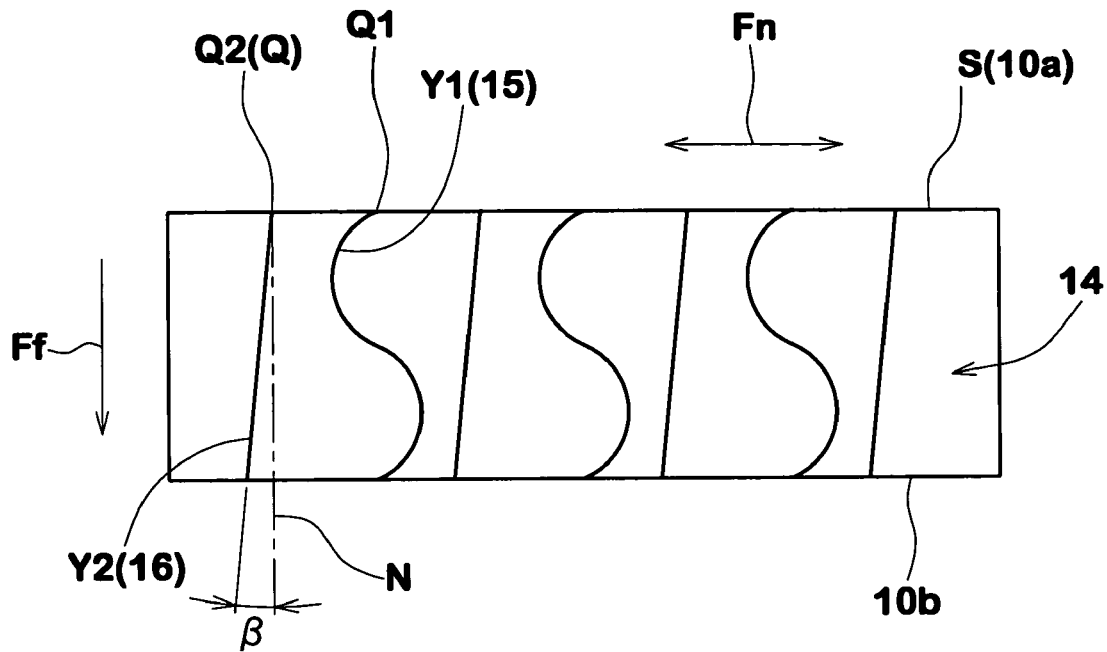
FIGS. 6 and 7 are diagrams each showing another example of the non-zigzag line described by a zigzag's vertex Q2.
Figure 7:
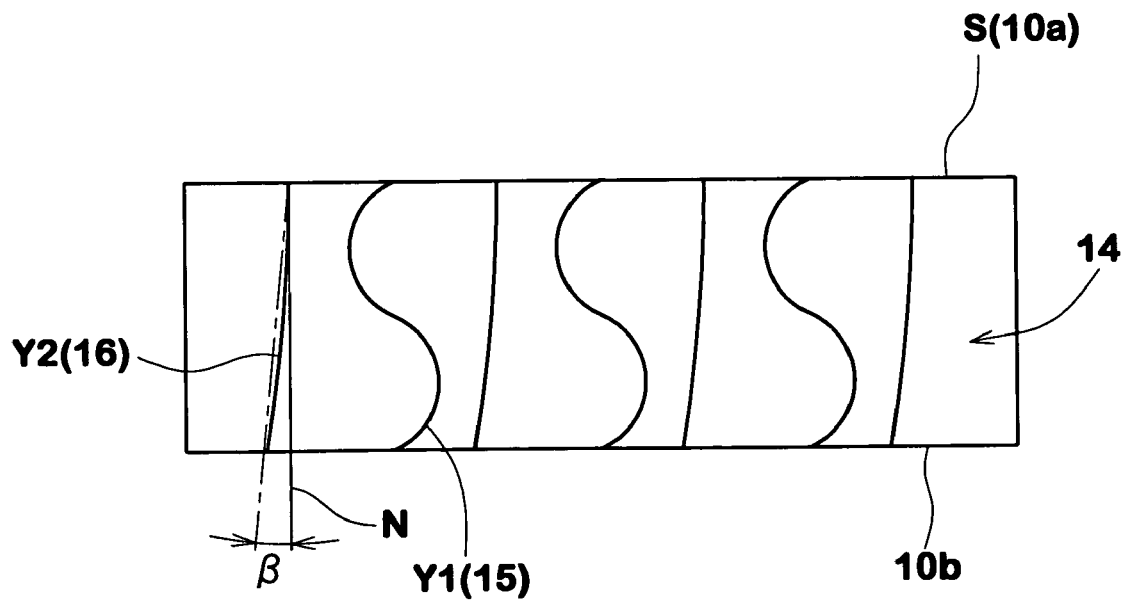

In the example shown in FIGS. 4 and 5, the vertexes Q2 do not shift in the longitudinal direction of the sipe. Accordingly, when viewed in the normal direction to the longitudinal direction Fn of the sipe, the vertexes Q2 describe straight lines 16 perpendicular to the tread surface. It is however also possible to incline at a small angle (beta) as shown in FIGS. 6 and 7 by shifting toward one direction only.

In contrast, the vertexes Q1 describe zigzag lines 15 when viewed in the normal direction to the longitudinal direction Fn of the sipe. Thus, the zigzag line 15 comprises portions 17A and 17B inclined in the longitudinal direction Fn of the sipe. The portion 17A is inclined toward one direction, and the portion 17B is inclined toward the opposite direction. These portions continue through a turning point R.

As the depth increases, the distance L between any two adjacent vertexes Q1 and Q2 measured in plane parallel to the tread surface varies, making increase and decrease. Further, with respect to any two adjacent zigzag segments between the vertexes Q1 and Q2, the ratio of the length of one segment to the length of the other segment varies continuously between a value under 1.0 and a value over 1.0. Incidentally, the length is defined as measured along the segment at a certain depth, namely measured in a plane parallel with the tread surface.

The shift T in the longitudinal direction Fn or peak-to-peak amplitude of the zigzag line 15 is preferably in a range of from 1.5 to 3.0 mm. If the shift T is less than 1.5 mm, it becomes difficult to improve the block rigidity. If the shift T is more than 3.0 mm, the pulling-out resistance of the sipping blades unfavorably increases.

As described above, the peak-to-peak amplitude w of the zigzag configuration of the sipe is in a range of from 1.0 to 5.0 mm. AS the amplitude w is constant throughout the depth in this example, the vertexes Q1 are on a plane parallel to the center plane defined by the center line x, and the vertexes Q2 are on a plane on the other side of the center plane x parallel to the center plane x.

In view of the pulling-out resistance, the number of the turning points R of the zigzag line 15 is 1, 2 or 3, preferably 2. Further, in this example, in order to reduce the pulling-out resistance, the zigzag line 15 is curved smoothly like a sinusoidal waveform.

When a block is divided by sipes into small pieces, the outer part of the pieces may be moved easier than the inner part because the radially outer ends of the pieces are free but the inner ends are fixed. Thus, it is desirable for the outer part to control its movement in order to maintain the block rigidity. For the inner part, however, it is desirable to make easier the removal of sipping blades rather than to control movement. It is therefore, desirable to employ the following designs (A), (B) and (C) in a sipe separately or in combination.

Figure 8:
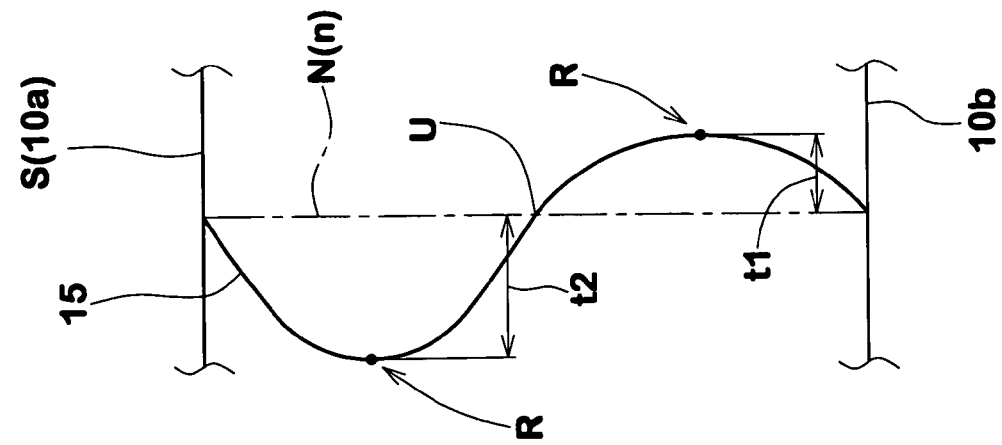

(A) As shown in FIG. 8, the distances of the turning points R of the zigzag line 15 measured from the center line (n)

drawn from the vertex Q1 at the sipe top along the normal direction N to the ground contacting surface S are gradually decreased from the top 10a toward the bottom 10b of the sipe. Accordingly, the amplitude t1 at the inner turning point R (not peak-to-peak) becomes less than the amplitude t2 at the outer turning point R.

Figure 9:
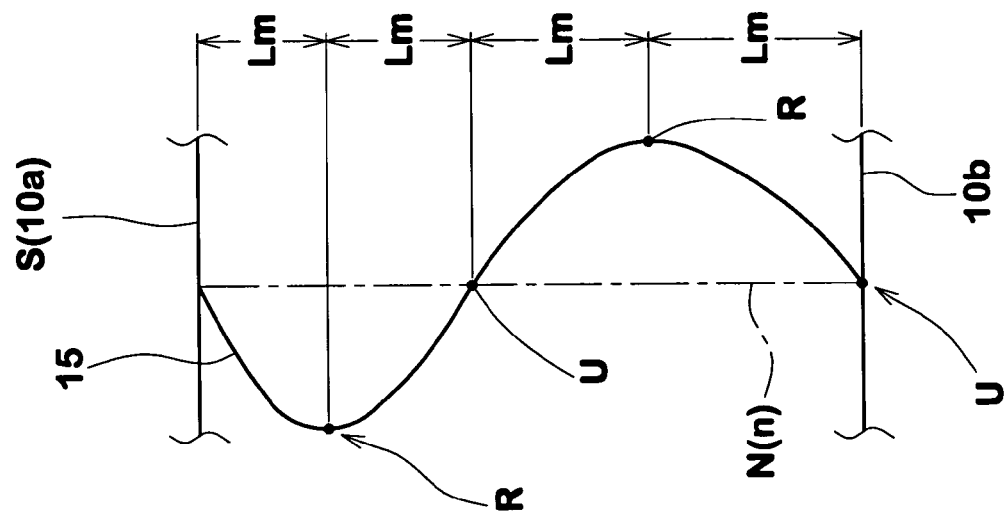

(B) Given that, as shown in FIG. 9, points (m) are the vertex Q1 at the sipe top, turning points R, and points U of intersection between the zigzag line 15 and center line (n), the distances Lm between the adjacent points (m) measured in the depthwise direction of the sipe, namely, quarter-wavelengths LM are gradually increased from the top 10a toward the bottom 10b of the sipe.

Figure 10:
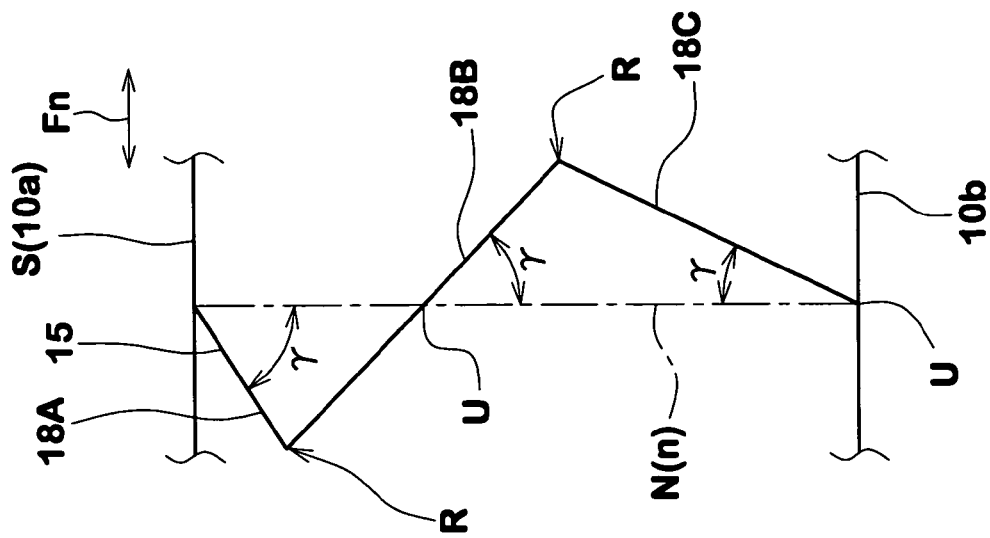
FIGS. 8, 9 and 10 are diagrams each showing another example of the zigzag line described by a zigzag's vertex Q1.

(C) As shown in FIG. 10, the zigzag line 15 is made up of three or more substantially straight segments 18A, 18B and 18C, and the inclination angles (gamma) of these segments with respect to the center line (n) are gradually decreased from the top 10a toward the bottom 10b of the sipe.

Since such zigzag lines 15 and non-zigzag lines 16 alternate in the longitudinal direction Fn, in the outer part, engaging force between the opposite walls 14 of the sipe 10 can be increased, and the movement of the divided pieces is reduced and the block rigidity is improved. In the inner part, on the other hand, engaging force between the walls 14 of the sipe and the surfaces of the sipping blade can be decreased, and the removal of sipping blade becomes easier.

Further, in view of the removal of sipping blade, it is preferable that the lines which are outermost in the longitudinal direction of the sipe 10 are the non-zigzag line 16 than the zigzag line 15. For the same reason, it is preferable that the non-zigzag line 16 is a straight line rather than a curved line. Further, the above-mentioned angle (beta) is less than 30 degrees, more preferably less than 10 degrees or almost zero degree.

Figure 11:
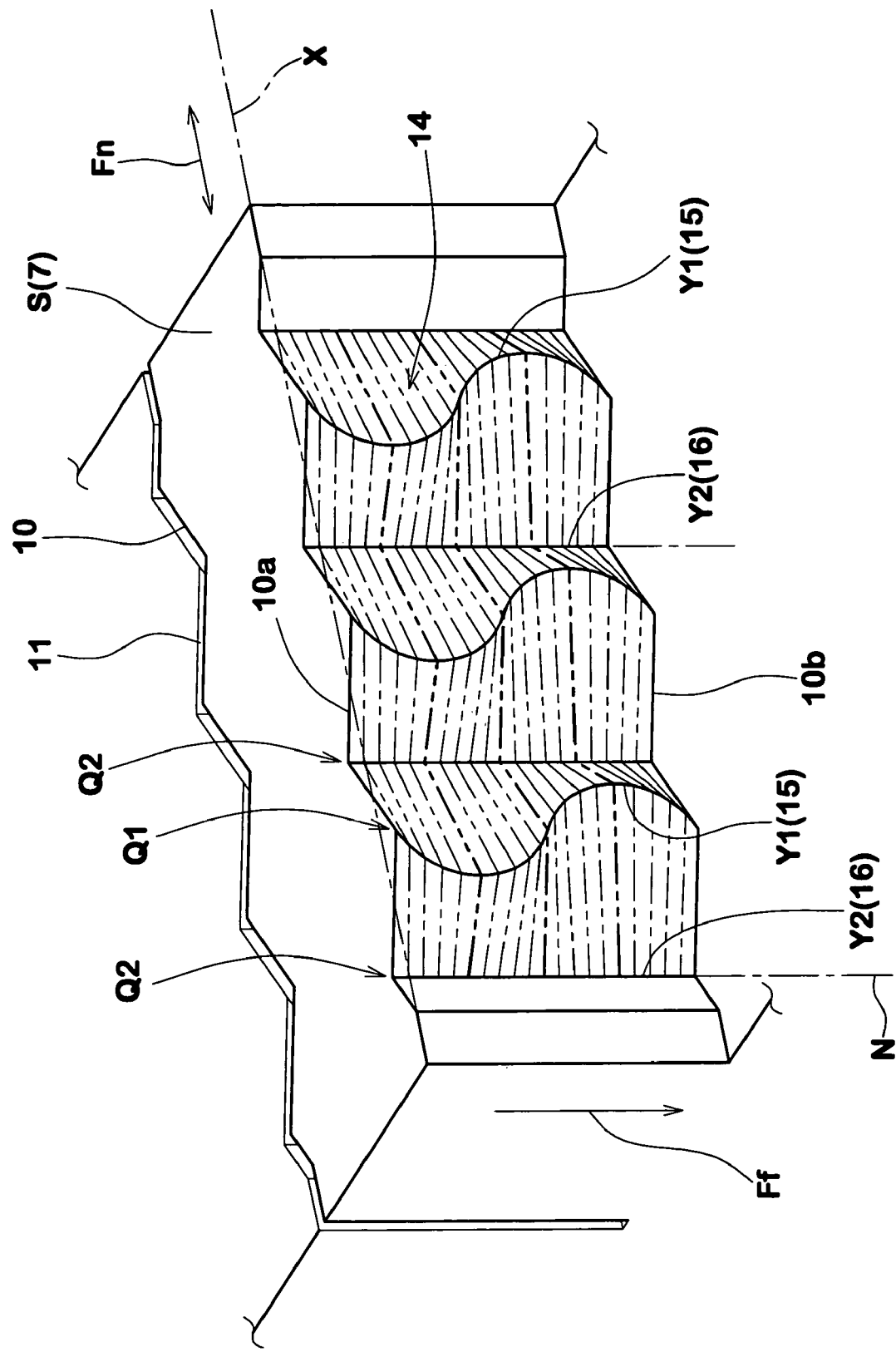
FIG. 11 is a perspective view showing a wall of the sipe shown in FIG. 5.

FIG. 11 shows one of the opposite walls 14 of a sipe 10 in which the zigzag line 15 is a smoothly curved line like a sinusoidal waveform when viewed in the normal direction to the longitudinal direction Fn of the sipe. Of course, the other wall is similar but the pattern thereof is revered. Specifically, in one of the walls 14, as shown in FIG. 3, the zigzag lines 15 form ridgelines Y1, and the non-zigzag lines 16 form valley lines Y2. But, in the other wall (not shown), the same zigzag lines 15 form valley lines (Y2), and the same non-zigzag lines 16 form ridgelines (Y1).

Figure 12:
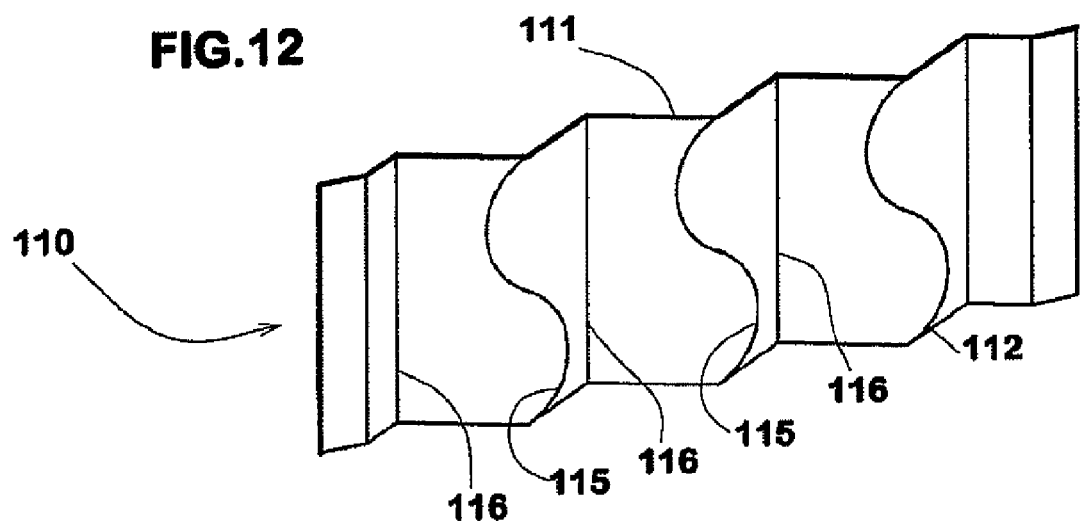
FIG. 12 is a perspective view showing the sipping blade for the sipe shown in FIGS. 5 and 11.

The pneumatic tire 1 having the sipes 10 is manufactured by first building a raw tire, putting the raw tire in a tire vulcanizing mold and vulcanizing the raw tire in the mold as usual. The mold is provided in the tread molding surface with sipping blades 110. The sipping blade 110 has a shape corresponding to the shape of the sipe 10 as described above. For example, in the case of the sipe 10 shown in FIG. 11, the sipping blade 110 has the shape shown in FIG. 12. The sipping blade 110 has an edge 111 corresponding to the open top 11, an edge 112 corresponding to the sipe bottom, first bend lines 115 corresponding to the zigzag lines 15 and second bend lines 116 corresponding to the non-zigzag lines 16. The edge 111 is fixed to the inside of the mold, and the edge 112 is free and stuck into the tread rubber. After the tire is vulcanized, the tire is removed from the mold as the blades are pulled out from the tire.

Comparison Tests

Studless radial tire of size 195/65R15 for passenger cars having the same tire structure and the same tread pattern shown in FIG. 1 were made, changing the structure of the sipes, and tested for steering stability on the ice road and dry paved road, and the pulling-out resistance of sipping blades was measured.

Figure 13:
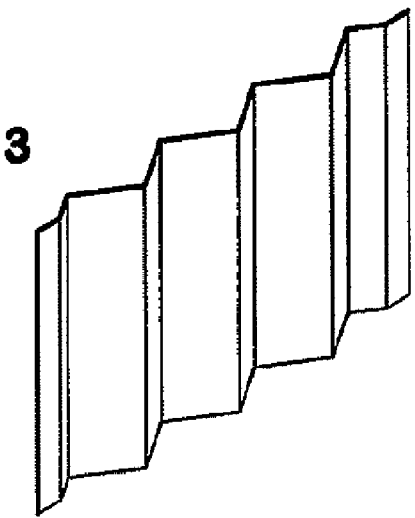
FIGS. 13 and 14 are perspective views of sipping blades used in the undermentioned comparison tests, which views correspond to the perspective views of the resultant sipes.
Figure 14:
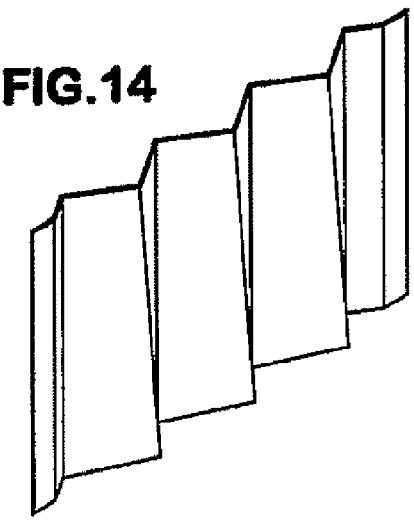
Figure 15:
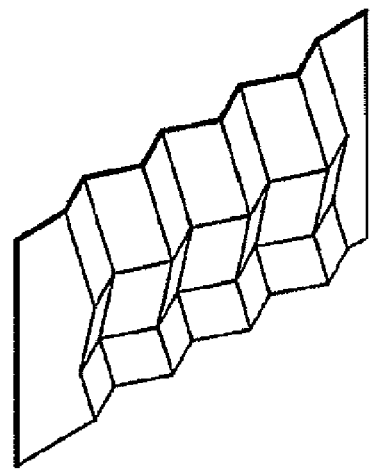
FIGS. 15 and 16 are perspective views of a sipping blade and the resultant sipe according to the Prior art.

Throughout all the tires, zigzag configurations of the sipes at the open top were the same as that of FIG. 2. Only the patterns of the sipe's walls were changed. The specifications thereof are shown in Table 1. The shapes of the sipping blades used are show in FIGS. 12-15. In FIG. 13, the vertexes Q1 and Q2 were not shifted and the zigzag configuration of the sipe was not changed throughout the depth of the sipe. In FIG. 14, only the vertexes Q1 were shifted linearly toward one direction only. In FIG. 15, all the vertexes Q1 and Q2 were shifted linearly towards the same direction and the walls were made up of parallelograms.

(1) Steering Stability Test:

using a 2000 cc front-engine rear-drive passenger car provided on all the four wheels with test tires (tire pressure 200 kPa, rim size 15×6JJ), steering stability during running on the ice road and dry paved road was evaluated by the test driver based on the steering responsiveness, rigidity, and road grip during braking and accelerating. The results are indicated in Table 1 by an index based on Ref.1 being 100, wherein the larger the index number, the better the steering stability.

(2) Sipping Blade Pulling-Out Test:

A mold for vulcanizing a rubber block of size 40×30×10 mm including a cap was made, and six sipping blades of the same type were attached to the cap. Raw rubber put in the mold was vulcanized to form six sipes and then the blades were pulled out from the vulcanized rubber block to measure the force required to pull-out. The force is indicated in Table 1 by an index based on Ref.1 being 100.

TABLE 1

Figure 16:
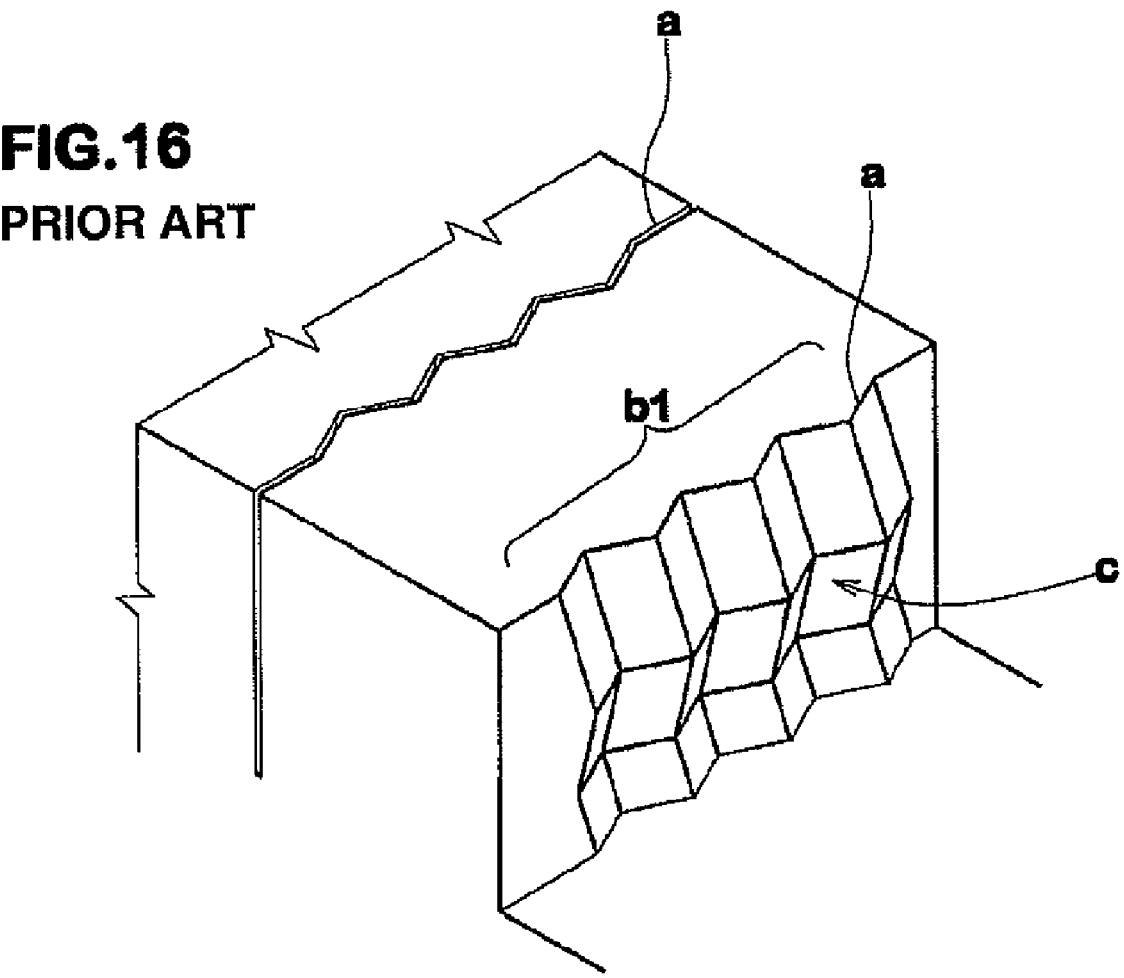

| Tire | Ref. 1 | Ref. 2 | Ref. 3 | Ex. 1 | Ex. 2 | Ex. 3 | Ex. 4 |
| --- | --- | --- | --- | --- | --- | --- | --- |
| Sipe(sipping blade) | FIG. 13 | FIG. 14 | FIG. 16(15) | FIG. 11(12) | FIG. 11(12) | FIGS. 11(12) + 9 | FIGS. 11(12) + 8 |
| Depth (mm) | 8 | 8 | 8 | 8 | 8 | 8 | 8 |
| Non-zigzag ridge and valley lines | | | | | | | |
| Angle beta (deg.) | 0 | 0/15 | 0 | 0 | 0 | 0 | 0 |
| Zigzag ridge and valley lines | none | none | | | | | |
| Zigzag type | — | — | linear | curve | curve | curve | curve |
| Number of turning point R | — | — | 2 | 2 | 3 | 2 | 2 |
| Shift T (mm) | — | — | 3 | 1.5 | 1.5 | 1.5 | 1.5 |
| t1/t2 (mm) | — | — | 1.5/1.5 | 0.75/0.75 | 0.75/0.75 | 0.75/0.75 | 0.5/1.0 |
| Lm (mm) | — | — | 2 | 2 | 2 | 1.5/1.5/2.5/2.5 | 2 |

TABLE 1-continued

| Tire | Ref. 1 | Ref. 2 | Ref. 3 | Ex. 1 | Ex. 2 | Ex. 3 | Ex. 4 |
|---|---|---|---|---|---|---|---|
| Test results Steering stability | | | | | | | |
| Ice road | 100 | 102 | 120 | 115 | 115 | 113 | 113 |
| Dry paved road | 100 | 102 | 120 | 115 | 118 | 113 | 113 |
| Blade pulling-out | 100 | 101 | 120 | 110 | 113 | 105 | 106 |

In Ref.3, the steering stability became best in return for the largest pulling-out force. In the tires according to the present invention, although the steering stability could maintain the almost same levels as Ref.3, the blade pulling-out force was effectively reduced.

As described above, according to the present invention, the zigzag lines 15 and non-zigzag lines 16 alternate in the longitudinal direction of the sipe. Therefore, in the neighborhood of the non-zigzag lines, the engaging force between the sipping blade and vulcanized tread rubber becomes relatively small. Accordingly, when the sipping blade is pulled, the engagement is first broken in the neighborhood of the non-zigzag lines, and as the blade moves, a tensile stress concentrates in the neighborhood of the zigzag lines. As the rubber can make an elastic deformation easily and under a tensile stress the engaging force is greatly reduced, the pull-out resistance of the blade is effectively reduced. On the other hand, the engaging force between the opposed walls of the sipe is not so reduced by the non-zigzag lines 16 under a compressive stress during running. Therefore, it is possible to improve tire performance such as steering stability and also prevent the sipping blade from being damaged and thereby improving the tire manufacturing efficiency.

The invention claimed is:

1. A pneumatic tire comprising
a tread portion provided with sipes,
the sipes each having a zigzag configuration at any depth from the top of the sipe to a certain depth,
the zigzag configuration having vertexes Q1 on one side of the zigzag and vertexes Q2 on the other side of the zigzag defining a center line with respect to the peak-to-peak zigzag amplitude of the zigzag configuration, wherein
as the depth increases from the top of the sine to said certain depth,
the vertexes Q1 shift in the longitudinal direction of the sipe and the direction of the shift is turned at least once such that the vertexes Q1 first shift towards one direction then towards the other direction, thereby describing a zigzag line extending from the top of the sipe to said certain depth and having at least one turning point, and
the vertexes Q2 do not shift in the longitudinal direction, whereby each vertex Q2 describes a straight line extending from the top of the sipe to said certain depth,
said center line defines a center plane, wherein
the vertexes Q1 are on a plane on one side of the center plane and parallel to the center plane, and
the vertexes Q2 are on a plane on the other side of the center plane and parallel to the center plane.

2. A pneumatic tire comprising
a tread portion provided with sipes,
the sipes each having a zigzag configuration at any depth from the top of the sipe to a certain depth,
the zigzag configuration having vertexes Q1 on one side of the zigzag and vertexes Q2 on the other side of the zigzag defining a center line with respect to the peak-to-peak zigzag amplitude of the zigzag configuration, wherein
as the depth increases from the top of the sipe to said certain depth,
the vertexes Q1 shift in the longitudinal direction of the sipe and the direction of the shift is turned at least once such that the vertexes Q1 first shift towards one direction then towards the other direction, thereby describing a zigzag line extending from the top of the sipe to said certain depth and having at least one turning point, and
the vertexes Q2 shift toward one direction without turning the direction of the shift, and each vertex Q2 describes a straight line extending from the top of the sipe to said certain depth,
said center line defines a center plane, wherein
the vertexes Q1 are on a plane on one side of the center plane and parallel to the center plane, and
the vertexes Q2 are on a plane on the other side of the center plane and parallel to the center plane.

3. A pneumatic tire comprising
a tread portion provided with sipes,
the sipes each having a zigzag configuration at any depth from the top of the sipe to a certain depth,
the zigzag configuration having vertexes Q1 on one side of the zigzag and vertexes Q2 on the other side of the zigzag defining a center line with respect to the peak-to-peak zigzag amplitude of the zigzag configuration, wherein
as the depth increases from the top of the sipe to said certain depth,
the vertexes Q1 shift in the longitudinal direction of the sipe and the direction of the shift is turned at least once such that the vertexes Q1 first shift towards one direction then towards the other direction, thereby describing a zigzag line extending from the top of the sipe to said certain depth and having at least one turning point, and
the vertexes Q2 shift toward one direction without turning the direction of the shift, and each vertex Q2 describes a slightly curved line extending from the top of the sipe to said certain depth,
said center line defines a center plane, wherein
the vertexes Q1 are on a plane on one side of the center plane and parallel to the center plane, and
the vertexes Q2 are on a plane on the other side of the center plane and parallel to the center plane.

4. the pneumatic tire according to claim 1, 2 or 3, wherein said zigzag line described by the vertex Q1 is a linear zigzag line.

5. The pneumatic tire according to claim 1, 2 or 3, wherein said zigzag line described by the vertex Q1 is a smoothly curved zigzag line.

6. The pneumatic tire according to claim 1, 2 or 3, wherein said zigzag line described by the vertex Q1 is a linear zigzag line of which segments are inclined at angles gradually decreasing from the top of the sipe toward the bottom of the sipe.

7. The pneumatic tire according to claim 1, 2 or 3, wherein
said zigzag line described by the vertex Q1 has two or more turning points (R), and
the amount (t1, t2) of shift at the turning points (R) is gradually decreased from the top toward the bottom of the sipe.

8. The pneumatic tire according to claim 1, 2 or 3, wherein said zigzag line described by the vertex Q1 has variable quarter-wavelengths (LM) gradually increasing from the top toward the bottom of the sipe.

9. The pneumatic tire according to claim 1, 2 or 3, wherein
said zigzag line described by the vertex Q1 has two or more turning points (R), and
the amount (t1, t2) of shift at the turning points (R) is gradually increasing for the top toward the bottom of the sipe, and further
the zigzag line has variable quarter-wavelengths (LM) gradually increasing from the top toward the bottom of the sipe.

10. The pneumatic tire according to claim 1, 2 or 3, wherein
said zigzag line described by the vertex Q1 is a linear zigzag line of which segments are inclined at angles gradually decreasing from the top of the sipe toward the bottom of the sipe, and further
the zigzag line has variable quarter-wavelengths (LM) gradually increasing from the top toward the bottom of the sipe.

* * * * *